Oct. 20, 1925.

J. B. MATTSON

BATTERY BOX

Filed Feb. 29, 1924

1,558,384

Inventor
John B. Mattson

Attorney

Patented Oct. 20, 1925.

1,558,384

UNITED STATES PATENT OFFICE.

JOHN B. MATTSON, OF BOSTON, MASSACHUSETTS, ASSIGNOR TO HOOD RUBBER COMPANY, OF WATERTOWN, MASSACHUSETTS, A CORPORATION OF MASSACHUSETTS.

BATTERY BOX.

Application filed February 29, 1924. Serial No. 695,940.

*To all whom it may concern:*

Be it known that I, JOHN B. MATTSON, a citizen of the United States, and resident of Boston, in the county of Suffolk and State of Massachusetts, have invented certain new and useful Improvements in Battery Boxes, of which the following is a specification.

My present invention relates to improvements in battery boxes for containing the active elements of secondary battery boxes, and is designed more especially for motor vehicles, though not limited to such use.

Battery boxes of hard rubber as ordinarily constructed, are of a brittle nature and in the jolting to which they are subjected in shipment and in use in motor vehicles, are liable to chip or crack at the base and lower corners where they contact with the supports. My invention aims to provide a one-piece or homogeneous box, having a cushioned bottom or base and corners which will overcome such objections, and the invention includes the novel features of construction hereinafter described and particularly defined by the appended claims.

An embodiment of my invention is illustrated in the accompanying drawing, in which I have shown as a convenient example, a three-cell or compartment box.

In this drawing:—

Figure 1:
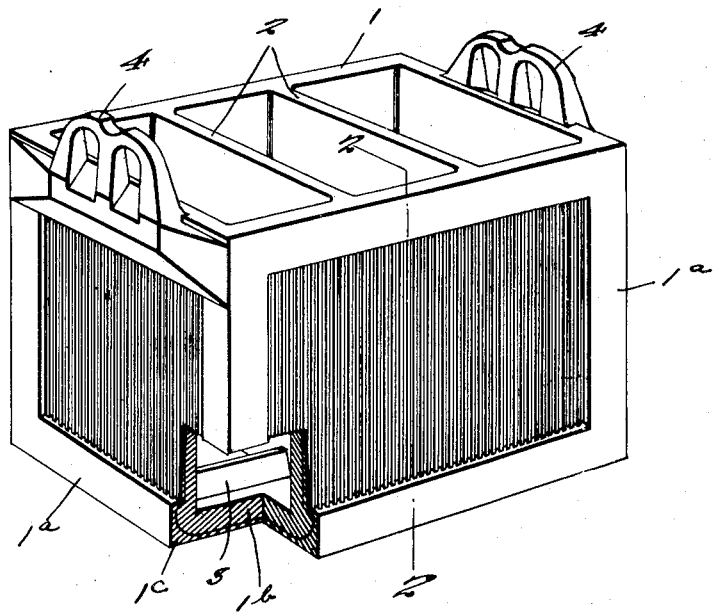
Figure 1 is a perspective view of the box partly broken away.
Figure 2:
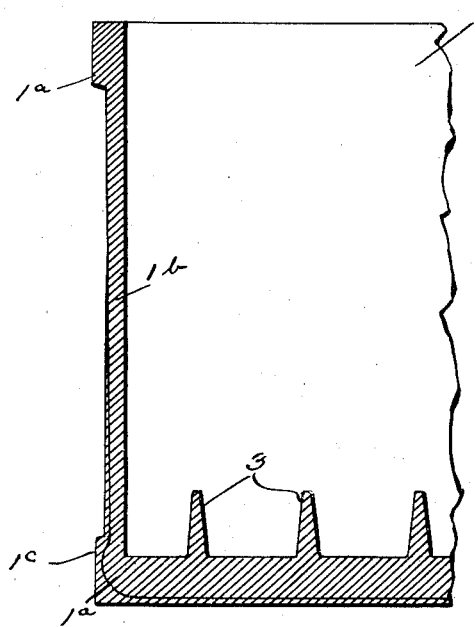
Fig. 2 is a section on line 2—2 of Fig. 1.

Referring by reference characters to this drawing, the numeral 1 designates the box as a whole which is preferably provided with thickened portions or ribs 1ª defining the edges and corners of the box. The box is provided with the customary integral partitions 2, corresponding to the number of cells or compartments desired, and with the usual internal bottom cross ribs or bridges 3. The handles shown at 4 may be of the usual or any desired construction. As above stated, the body of the box is composed of hard rubber and to cushion and protect the bottom and adjacent edges or corners of the box, I provide it with a surfacing of soft rubber which is homogeneously or integrally united thereto in the vulcanizing, the soft rubber-forming material being so compounded as to vulcanize in the same time and under the same degree of heat as the hard rubber compound.

In this drawing, the hard rubber is designated 1ᵇ and the soft rubber 1ᶜ. It will be observed that the soft rubber completely envelops the bottom and lower portions of the box and affords a cushion surface thereto, and it will also be noticed that this cushion is thickest at the edges or corners where the box is more liable to be chipped or cracked, the ribs or thickened portions adjacent the bottom of the box being, as shown, composed (preferably) wholly of soft rubber.

As the soft rubber does not extend clear to the top of the box, but preferably terminates about half way, the full strength of the upper portion is maintained to withstand the strains of lifting and the customary hold-down devices. The box may be vulcanized in the usual, or any desired form of mold, and in the vulcanizing operation the soft and hard rubber compounds are united in a single homogeneous article with its walls of uniform thickness.

Having thus described my invention, what I claim is:—

1. A rubber battery box having a body of hard rubber and having its bottom and lower portion only of its vertical walls provided with an exterior layer of relatively soft rubber homogeneously united therewith.

2. A rubber battery box having a body of hard rubber with the lower portion thereof provided with an exterior layer of soft rubber homogeneously united thereto, the upper portion of the box being wholly of hard rubber.

3. A rubber battery box having a body of hard rubber with the lower portion thereof provided with an exterior layer of soft rubber homogeneously united thereto, said soft rubber layer being thickest at the corners.

4. A rubber battery box having a body composed mainly of hard rubber and having thickened portions or ribs defining the edges of the box, the ribs adjacent the bottom comprising relatively thick surface layers of soft rubber homogeneously united thereto.

5. A one-piece rubber battery box having thickened portions or ribs defining the edges of the box, and additional ribs or ledges projecting from the upper edges of the ends of the box, and carrying handles recessed to receive hold-down devices, the lower portion only of the box being provided with a homogeneous layer of soft rubber which is thickest at the edges and corners of the ribs, the upper portion of the box including the end ribs or projections and handles, being wholly of hard rubber.

In testimony whereof, I affix my signature.

JOHN B. MATTSON.